(No Model.)

M. B. NICHOLSON.
TRAP.

No. 414,818. Patented Nov. 12, 1889.

WITNESSES:
Phil C. Dieterich
E. Sedgwick

INVENTOR:
M. B. Nicholson
BY Munn & Co.
ATTORNEYS.

UNITED STATES PATENT OFFICE.

MICHAEL B. NICHOLSON, OF NEW YORK, N. Y.

TRAP.

SPECIFICATION forming part of Letters Patent No. 414,818, dated November 12, 1889.

Application filed November 13, 1888. Serial No. 290,696. (No model.)

*To all whom it may concern:*

Be it known that I, MICHAEL B. NICHOLSON, of the city, county, and State of New York, have invented a new and Improved Trap, of which the following is a full, clear, and exact description.

My invention relates to an improvement in traps, specially that class of traps known as "sewer" or "sanitary" traps, and has for its object to provide a trap of simple and durable construction, having attached thereto a flushing-chamber, whereby the trap is effectually protected against siphonage under ordinary circumstances.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
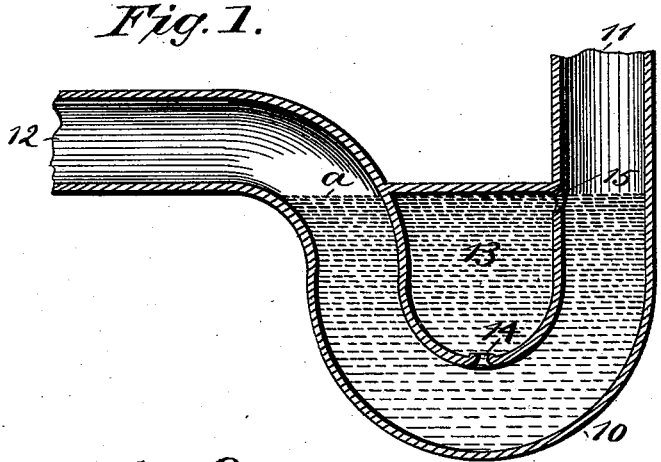
Figure 2:
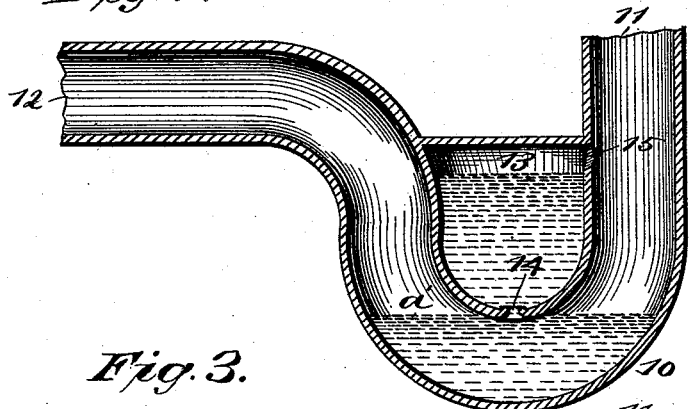
Figure 3:
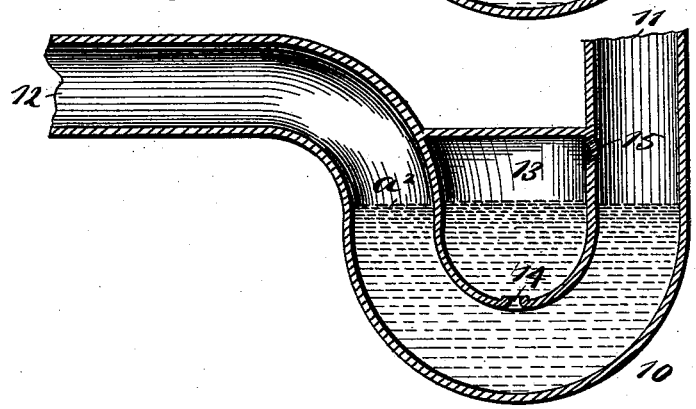

Figure 1 is a central vertical section through the improved trap, illustrating the position of the water immediately upon the basin or drain being emptied. Fig. 2 is a similar section illustrating the position of the water after the usual siphonage has taken place, and Fig. 3 is also a central vertical section illustrating the normal level of the water.

In carrying out the invention the trap is preferably constructed with the usual U-shaped body 10, the inlet being at 11 and the outlet at 12. Between the vertical members of the body a closed chamber 13 is constructed, the walls of which chamber may be integral with or attached to the body. The chamber 13 essentially fills the space vertically between the members of the body and may be built out horizontally to contain any desired amount of liquid. In the upper wall of the bow portion of the body an aperture 14 is produced, whereby a communication is established between the chamber 13 at the bottom and the said bow portion of the body, and a second communication is established between the body and the chamber 13 through an aperture 15, formed in the inlet member of the former at or near the top of the latter.

The complete trap may be constructed of any suitable material and may be secured in any approved manner to a basin, drain, or equivalent receptacle from which water is to be discharged to a sewer, soil, or other off-take pipe.

In operation the water as it passes from a basin, for instance, not only flows through the body of the trap, but also enters the chamber 13 through the inlet-aperture 15, filling the same, whereby, when all the water has passed from the basin, the water-line will be established, as at $a$, in Fig. 1. After the ordinary siphonage has taken place, leaving the water-line in the body as at $a'$ in Fig. 2, the water in the reservoir-chamber flows through the outlet-aperture 14 into the body and a normal water-line $a^2$ is established, as shown in Fig. 3. A complete seal is thus obtained and sufficient water is retained in the trap to maintain a seal for a considerable length of time in the presence of suction created by discharge from adjoining receptacles.

Having thus described my invention, what I claim as new, and desire to secure by Letters Patent, is—

1. The combination, with a trap having an essentially U-shaped body 10, the inlet 11 and the outlet 12, of the water-chamber 13, arranged between the vertical members of the body and communicating at its bottom with the bow portion of the body and at its top with the inlet 11, substantially as described, whereby provision is made for supplying the trap with water after siphonage has taken place and the withdrawal of the water from the chamber by siphonage prevented, as set forth.

2. The combination, with a trap having an essentially U-shaped body 10, provided with the opening 14 in the upper wall of its bow portion, the inlet 11, having the opening 15 and the outlet 12, of the water-chamber 13, arranged between the vertical members of the body of the trap, with the walls of the said members forming two sides of the chamber, the said chamber being of a depth to extend just above the opening 15 in the inlet 11, substantially as and for the purpose set forth.

MICHAEL B. NICHOLSON.

Witnesses:
J. F. ACKER, Jr.,
C. SEDGWICK.